United States Patent
Hui et al.

(10) Patent No.: US 11,417,049 B2
(45) Date of Patent: Aug. 16, 2022

(54) AUGMENTED REALITY WALL WITH COMBINED VIEWER AND CAMERA TRACKING

(71) Applicant: ARWall, Inc., Westlake Village, CA (US)

(72) Inventors: Leon Hui, Hawthorne, CA (US); Rene Amador, Studio City, CA (US); William Hellwarth, Santa Monica, CA (US); Michael Plescia, Woodland Hills, CA (US)

(73) Assignee: ARWall, Inc., Burbank, CA (US)

( * ) Notice: Subject to any disclaimer, the term of this patent is extended or adjusted under 35 U.S.C. 154(b) by 0 days.

(21) Appl. No.: 16/897,012

(22) Filed: Jun. 9, 2020

(65) Prior Publication Data
US 2020/0302679 A1    Sep. 24, 2020

Related U.S. Application Data

(63) Continuation of application No. 16/441,659, filed on Jun. 14, 2019, now Pat. No. 10,719,977, which is a
(Continued)

(51) Int. Cl.
| | |
|---|---|
| *G06T 15/20* | (2011.01) |
| *G06T 7/70* | (2017.01) |
| *H04N 13/00* | (2018.01) |
| *G06T 19/00* | (2011.01) |
| *G06F 3/01* | (2006.01) |

(Continued)

(52) U.S. Cl.
CPC .............. *G06T 15/20* (2013.01); *G06F 3/012* (2013.01); *G06F 3/013* (2013.01); *G06T 7/70* (2017.01); *G06T 7/73* (2017.01); *G06T 19/006* (2013.01); *G06V 40/23* (2022.01); *H04N 13/00* (2013.01); *G06T 2207/10048* (2013.01)

(58) Field of Classification Search
CPC ............ G06T 15/20; G06T 7/70; H04N 13/00
See application file for complete search history.

(56) References Cited

U.S. PATENT DOCUMENTS

| | | |
|---|---|---|
| 6,009,210 A | 12/1999 | Kang |
| 2009/0096994 A1 | 4/2009 | Smits |

(Continued)

OTHER PUBLICATIONS

United States Patent Office/ISA, International Search Report and Written Opinion for PCT Application No. PCT/US2019/037322, dated Sep. 9, 2019.

*Primary Examiner* — Matthew D Salvucci
(74) *Attorney, Agent, or Firm* — Socal IP Law Group LLP; Jonathan Pearce

(57) ABSTRACT

A system for real-time updates to a display based upon the location of a camera or a detected location of a human viewing the display or both is disclosed. The system enables real-time filming of an augmented reality display that reflects realistic perspective shifts. The display may be used for filming, or may be used as a "game" or informational screen in a physical location, or other applications. The system also enables the use of real-time special effects that are centered upon an actor or other human to be visualized on a display, with appropriate perspective shift for the location of the human relative to the display and the location of the camera relative to the display.

20 Claims, 12 Drawing Sheets

Related U.S. Application Data continuation-in-part of application No. 16/210,951, filed on Dec. 5, 2018, now Pat. No. 10,740,958.

(60) Provisional application No. 62/685,388, filed on Jun. 15, 2018, provisional application No. 62/685,386, filed on Jun. 15, 2018, provisional application No. 62/685,390, filed on Jun. 15, 2018, provisional application No. 62/595,427, filed on Dec. 6, 2017.

(51) Int. Cl.
*G06T 7/73* (2017.01)
*G06V 40/20* (2022.01)

(56) References Cited

U.S. PATENT DOCUMENTS

2015/0348326 A1   12/2015   Sanders et al.
2015/0350628 A1*  12/2015   Sanders ................. G06T 15/08
                                                            345/419

\* cited by examiner

AUGMENTED REALITY WALL WITH COMBINED VIEWER AND CAMERA TRACKING

RELATED APPLICATION INFORMATION

This patent claims priority from U.S. provisional patent application Ser. No. 62/685,386 filed Jun. 15, 2018 and entitled "AUGMENTED REALITY BACKGROUND FOR USE IN MOTION PICTURE FILMING."

This patent claims priority from U.S. provisional patent application Ser. No. 62/685,388 filed Jun. 15, 2018 and entitled "AUGMENTED REALITY WALL WITH VIEWER TRACKING AND INTERACTION."

This patent claims priority from U.S. provisional patent application with Ser. No. 62/685,390 filed Jun. 15, 2018 and entitled "AUGMENTED REALITY WALL WITH COMBINED VIEWER AND CAMERA TRACKING"

This patent is also a continuation of U.S. patent application with Ser. No. 16/441,659 filed Jun. 14, 2019 and entitled "AUGMTED REALITY WALL WITH COMBINED VIEWER AND CAMERA TRACKING" which claims priority to and is a continuation-in-part of U.S. non-provisional patent application with Ser. No. 16/210,951 filed Dec. 5, 2018 and entitled "AUGMENTED REALITY BACKGROUND FOR USE IN LIVE-ACTION MOTION PICTURE FILMING" which claims priority to U.S. provisional patent application Ser. No. 62/595,427 filed Dec. 6, 2017 and entitled "AUGMENTED REALITY BACKGROUND FOR USE IN LIVE-ACTION MOTION PICTURE FILMING."

The disclosures of each of these applications are incorporated by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to augmented reality projection of backgrounds for filmmaking and other purposes. More particularly, this disclosure relates to enabling real-time filming of a projected screen while properly calculating appropriate perspective shifts within the projected content to correspond to real-time camera movement or movement of an individual relative to the screen.

Description of the Related Art

There exist various solutions for so-called "green screen" filming. Traditional green screen filming relies upon actors filming in front of (or sometimes wrapped in) a single color. Later, in post-production, digital objects, scenes, characters, movement, and the like may be added to the scene. For example, in the Ironman and related Marvel® movies, Robert Downey Jr. occasionally acts in a mock-up ironman suit, but also acts in a green suit that enables postproduction graphic artists to add movement and animations to the Ironman suit that are not necessarily possible or would be difficult or expensive to produce with physical props and wardrobe.

The downside of green screen filming is that it lowers the overall immersion for an individual within the scene for the actors and the directors who all have to imagine the character they are speaking with, or the location in which they are operating, or even the table at which they are sitting. Many times, the effort only marginally matters in terms of quality of the acting and film, but it can lower the quality. Also, it makes it much more difficult for the director to determine if the scene is "right" while filming. The postproduction process may add something unusual or need a particular perspective not captured. As a result, many of those types of scenes end up being corrected in re-shoots. Re-shoots and extra post production add to the costs of production and the time required to complete films. The rendering required for the green screen shots, if it must be corrected, can take substantial periods of time, up to days or weeks in some cases, depending on the length of the scene.

There also exist certain filming techniques that attempt to bridge this gap by providing a rendered scene (e.g. a three-dimensional high-quality scene) on a large display or already rendered for display "in place of" a green screen. Those systems typically film the individuals, then use computer vision techniques to detect those individuals' positions, movements, and the like. Then, the videos of those individuals may be superimposed within the scene digitally.

The downside of these techniques is that they typically incorporate a significant delay. The individuals must be captured on film, then computer vision applied to that video, then those individuals may be superimposed in an existing three-dimensional digital scene. The delay is often several seconds. In the best implementations, the delay is on the order of 3-5 frames of video. This may not sound like much, on the order of fractions of seconds, but if a character within a scene is to react to things happening in the digital scene, then he or she may appear to have significant delay in sensory perception to a viewing audience, or special cues must be set up to enable the actor to react appropriately. In general, adding such actions later in post-production is simply easier with the objects in the scene being cued off of the actor's feigned reaction.

There also exist augmented reality systems that superimpose objects within "reality" or a video of reality delivered with substantially no lag. These systems rely on trackers to monitor the position of the wearer of the augmented reality headset (most are headsets, though other forms exist) to continuously update the location of those created objects within the real scene. Less sophisticated systems rely upon motion trackers only, while more robust systems rely upon external trackers, such as cameras or fixed infrared tracking systems with fixed infrared points (with trackers on the headset) or infrared points on the headset (and fixed infrared trackers in known locations relative to the headset). These may be called beacons or tracking points. Still other systems rely, at least in part, upon infrared depth mapping of rooms or spaces, or LIDAR depth mapping of spaces. Other depth mapping techniques are also known. The depth maps create physical locations of the geometry associated with a location in view of the sensor. These systems enable augmented reality systems to place characters or other objects intelligently within spaces (e.g. not inside of desks or in walls) at appropriate distances from the augmented reality viewer.

However, augmented reality systems generally are only presented to an individual viewer, from that viewer's perspective.

Virtual reality systems are similar, but fully-render an alternative reality into which an individual is placed. The level of immersion varies, and the worlds into which a user is placed vary in quality and interactivity. But, again, these systems are almost exclusively from a single perspective of one user. First person perspectives like augmented reality and virtual reality are occasionally used in traditional cinematic and television filming, but they are not commonly used.

In a related field, interactive screens exist wherein users may interact with a screen, for example, at a mall or shopping center to play a game or to search for a store within the mall. These screens generally incorporate limited functionality. Some are capable of physically tracking an individual's interacting with the screen—typically for enabling interaction with a game, for example. But, these screens do not typically react or alter themselves based upon an attempt to recreate perspectives of a given scene for a particular individual interacting with that screen and scene.

Finally, post-production special effects can add lighting, objects, or other elements to actors or individuals. For example, "lightning" can project outward from Thor's hammer in a Marvel movie or laser beams can leave Ironman's hands. However, there does not currently exist a system wherein live, real-time effects can be applied to an actor and adjusted relative to a position of that actor within the scene.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
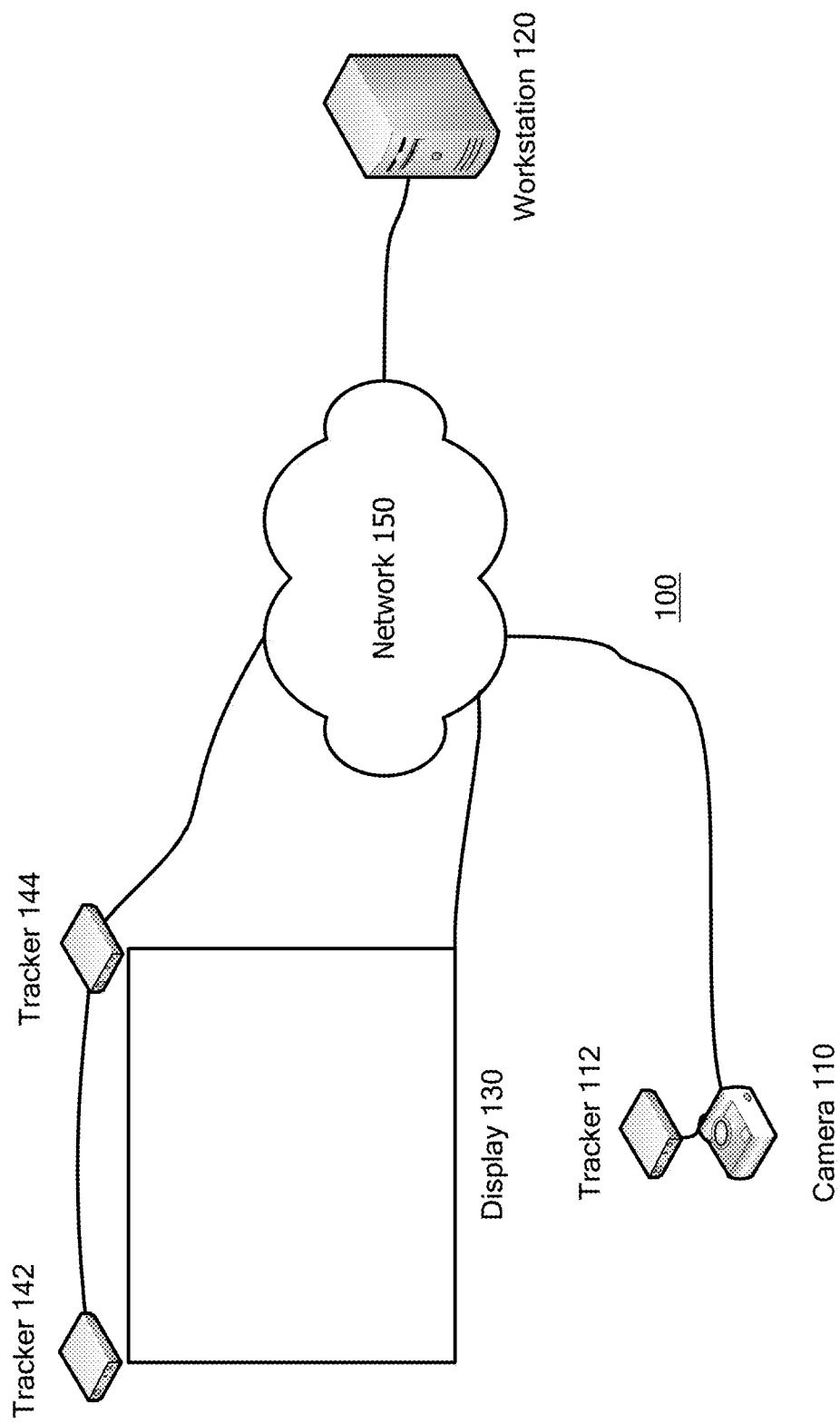
FIG. 1 is a diagram of a system for generating and capturing augmented reality displays.

Referring now to FIG. 1, a diagram of a system 100 for generating and capturing augmented reality displays. The system 100 includes a camera 110, an associated tracker 112, a workstation 120, a display 130, associated trackers 142 and 144, all interconnected by network 150.

The camera 110 is preferably a digital film camera, such as cameras from RED® or other high-end cameras used for capturing video content for theatrical release or release as television programming. Increasingly, digital cameras suitable for consumers are nearly as good as such professional-grade cameras. So, in some cases, lower-end cameras made primarily for use in capturing still images or film for home or online consumption may also be used. The camera is preferably digital, but in some cases, actual, traditional film cameras may be used in connection with the display 130, as discussed below. The camera may be or incorporate a computing device, discussed below with reference to FIG. 2.

The camera 110 either incorporates, or is affixed to, a tracker 112. The physical relationship between the camera 110 and tracker is such that the tracker's position, relative to the lens (or more-accurately, the focal point of the lens) is known or may be known. This known distance and relationship allows the overall system to derive an appropriate perspective from the point of view of the camera lens based upon a tracker that is not at the exact point of viewing for the camera lens by extrapolation.

So, for example, the tracker 112 may incorporate an infrared LED (or LED array) that has a known configuration such that an infrared camera may detect the infrared LED (or LEDs) and thereby derive a very accurate distance, location, and orientation, relative to the infrared camera. Other trackers may be fiducial markers, visible LEDs (or other lights), physical characteristics such as shape or computer-visible images. The tracker 112 may be a so-called inside-out tracker where the tracker 112 is a camera tracking external LEDs or other markers. Various tracking schemes are known, and virtually any of them may be employed in the present system.

The word "tracker" is used herein to generically refer to a component that is used to perform positional and orientational tracking. Trackers 142 and 144, discussed below, may be counterparts to tracker 112, discussed here. Trackers typically have at least one fixed "tracker" and one moving "tracker". The fixed tracker(s) is(are) used so as to accurately track the location of the moving tracker. But, which of the fixed and moving trackers is actually doing the act of tracking (e.g. noticing the movement) varies between systems. So, as used herein, it is not particularly relevant that the camera preferably employ a set of infrared LED lights that are tracked by a pair of infrared cameras that, thereby, derive the relative location of the infrared LED lights (affixed to the camera 110) other than to note that the relative positions are known and tracked and, thereby, the location of the camera 110 (more-accurately, the camera 110 lens) can be tracked in three-dimensional space.

The camera 110 may in fact be multiple cameras, though only one camera 110 is shown. In some cases, for example, the camera 110 may be mounted within, behind, or in a known location relative to the display and or trackers 142 and 144. Such a camera may be used to track the location of an individual in front of the display 130. For example, rather than tracking the camera 110 itself, the system may operate to shift the perspective of a scene or series of images shown on the display 130 in response to positional information detected from a human (e.g. a human head) in front of the display 130 viewing content on the display 130. In such a case, the display 130 may operate less as a background for filming content, but as an interactive display suitable for operation as a "game" or to present other content to a human viewer.

To enable this interaction, the camera 110 may be or include an infrared camera coupled with an infrared illuminator or a LIDAR or an RGB camera coupled with suitable programming to track a human's face or head. When discussed herein, in such cases where a human is tracked instead of a camera, like camera 110, the scene presented on the display may be updated based upon the human face, rather than the camera. In other situations, discussed more fully below, both the human and an associated camera, like camera 110 may be tracked to enable the system 100 to film an augmented reality background and to generate an augmented reality augmentation (discussed below) to the individual that is only visible on the display 130. Though tracking of the camera 110 is important, it may not be used in some particular implementations, or it may be used in connection with human tracking in others. These will be discussed more fully below.

The workstation 120 is a computing device, discussed below with reference to FIG. 2, that is responsible for calculating the position of the camera, relative to the display 130, using the trackers 112, 142, 144. The workstation 120 may be a personal computer or workstation-class computer incorporating a relatively high-end processor designed for either video game world/virtual reality rendering or for graphics processing (such as a computer designed for rendering three-dimensional graphics for computer-aided design (CAD) or three-dimensional rendered filmmaking). These types of computing devices may incorporate specialized hardware, such as one or more graphics processing units (GPUs), specially designed, and incorporating instructions sets designed, for graphical processing of vectors, shading, ray-tracing, applying textures, and other capabilities. GPUs typically employ faster memory than those of general purpose central processing units, and the instruction sets are better-formulated for the types of mathematical processing routinely required for graphical processing.

The workstation 120 interacts using the network (or other communication systems) with, at least, the tracker 112, trackers 142, 144, and with the display 130. The workstation 120 may also communicate with the camera 110 which is capturing live-action data. Alternatively, the camera 110 may store its captured data on its own systems (e.g. storage capacity inherent or inserted into the camera 110) or on other, remote systems (live, digital image storage systems) or both.

The display 130 is a large-scale display screen or display screens, capable of filling a scene as a background for filming live action actors in front of the display. A typical display may be on the order of 20-25 feet wide by 15-20 feet high. Though, various aspect ratios may be used, and screens of different sizes (e.g. to fill a window of an actual, physical set or to fill an entire wall of a warehouse-sized building) are possible. Though shown as a two-dimensional display, the display 130 may be a half-sphere or near half-sphere designed to act as a "dome" upon which a scene may be displayed completely encircling actors and a filming camera. The use of the half-sphere may enable more dynamic shots involving live actors in a fully-realized scene, with cameras capturing the scene from different angles at the same time.

The display 130 may be a single, large LED or LCD or other format display, such as those used in connection with large screens at sporting events. The display 130 may be an amalgamation of many smaller displays, placed next to one another such that no empty space or gaps are present. The display 130 may be a projector that projects onto a screen. Various forms of display 130 may be used.

The display 130 displays a scene (or more than one scene) and any objects therein from the perspective of the camera 110 (or person, discussed below), behind or in conjunction with any live actors operating in front of the display 130. The workstation 120 may use the trackers 112, 142, 144 to derive the appropriate perspective in real-time as the camera is moved about in view of the trackers.

The trackers 142, 144 are trackers (discussed above) that are oriented in a known relationship to the display 130. In a typical setup, two trackers 142, 144 are employed, each at a known relationship to a top corner of the display 130. As may be understood, additional or fewer trackers may be employed, depending on the setup of the overall system. The known relationship of the tracker(s) 142, 144 to the display 130 is used to determine the full extent of the size of the display 130 and to derive the appropriate perspective for display on the display 130 for the camera 110, based upon the position provided by the trackers 112, 142, 144 and calculated by the workstation 120. The trackers 112, 142, 144 may be or include a computing device as discussed below with respect to FIG. 2.

The network 150 is a computer network, which may include the Internet, but may also include other connectivity systems such as ethernet, wireless internet, Bluetooth® and other communication types. Serial and parallel connections, such as USB® may also be used for some aspects of the network 150. The network 150 enables communications between the various components making up the system 100.

Figure 2:
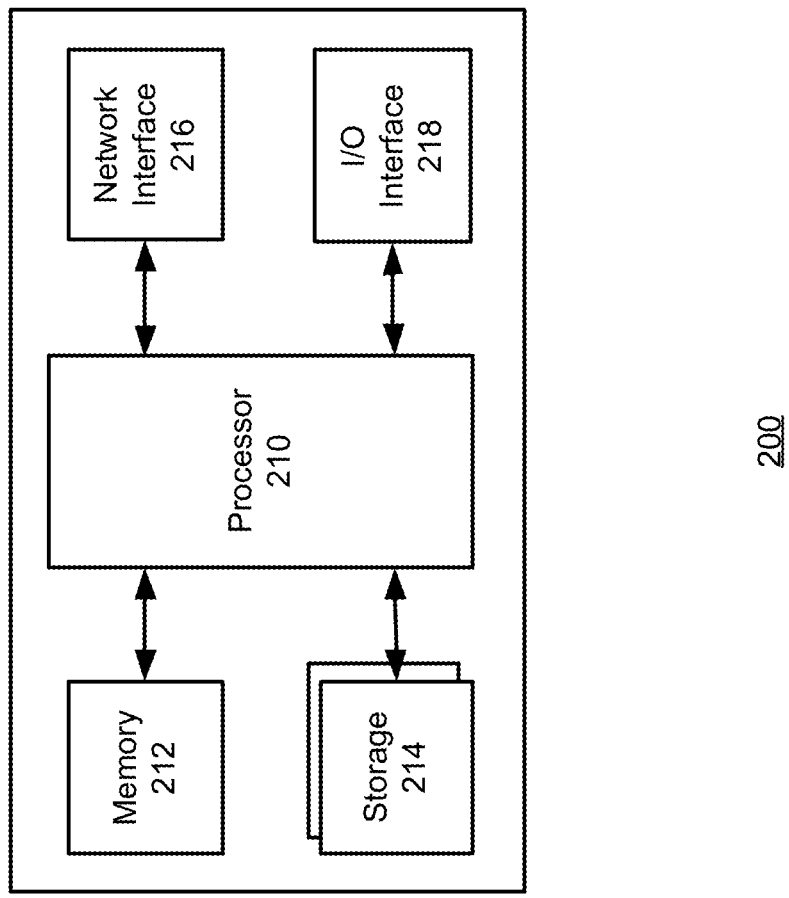
FIG. 2 is a block diagram of a computing device.

Turning now to FIG. 2 there is shown a block diagram of a computing device 200, which is representative of the camera 110 (in some cases), the workstation 120, and the trackers 112, 142, and 144 (optionally) in FIG. 1. The computing device 200 may be, for example, a desktop or laptop computer, a server computer, a tablet, a smartphone or other mobile device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 210 coupled to a memory 212, storage 214, a network interface 216 and an I/O interface 218. The processor 210 may be or include one or more microprocessors, specialized processors for particular functions, field programmable gate arrays (FPGAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210. As used herein the term "memory" corresponds to the memory 212 and explicitly excludes transitory media such as signals or waveforms.

The storage 214 provides non-volatile, bulk or long-term storage of data or instructions in the computing device 200. The storage 214 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the terms "storage" and "storage medium" explicitly exclude transitory media such as signals or waveforms. In some cases, such as those involving solid state memory devices, the memory 212 and storage 214 may be a single device.

The network interface 216 includes an interface to a network such as network 150 (FIG. 1). The network interface 216 may be wired or wireless.

The I/O interface 218 interfaces the processor 210 to peripherals (not shown) such as displays, video and still cameras, microphones, keyboards and USB® devices.

Figure 3:
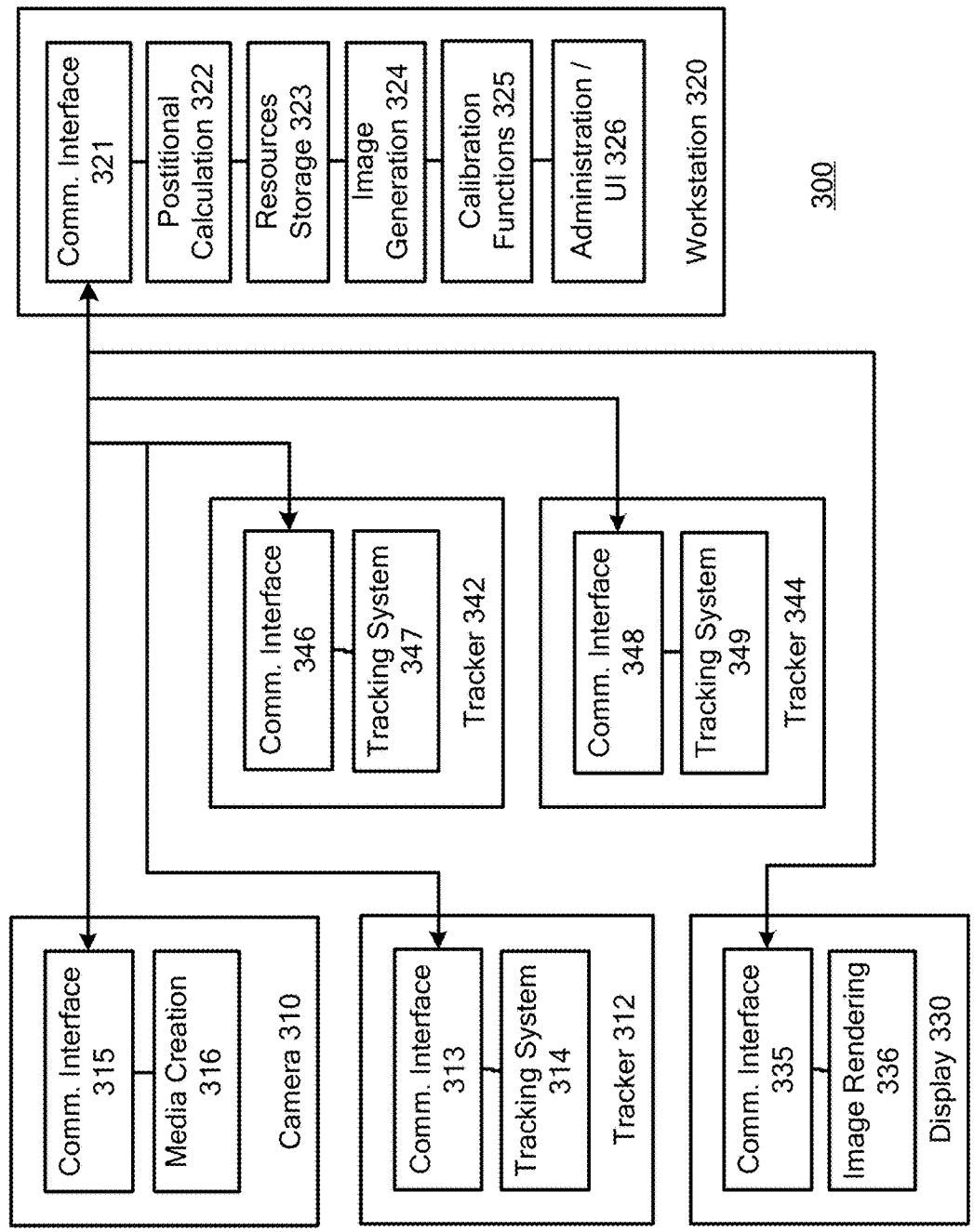
FIG. 3 is a functional diagram of a system for generating and capturing augmented reality displays.

FIG. 3 is a functional diagram of a system 300 for generating and capturing augmented reality backgrounds for filming. The system 300 includes a camera 310, a tracker 312, a tracker 342, a tracker 344, a display 330, and a workstation 320.

The camera 310, the tracker 312, the workstation 320, the display 330 and the trackers 342 and 344 each include a communications interface 315, 313, 321, 335, 346, and 348, respectively. Each of the communications interfaces 315, 313, 321, 335, 346, and 348 are responsible for enabling each of the devices or components to communicate data with the others. The communications interfaces 315, 313, 321, 335, 346, and 348 may be implemented in software with some portion of their capabilities carried out using hardware.

The camera 310 also includes media creation 316 which is responsible for capturing media (e.g. a scene) and storing that media to a storage location. The storage location may be local to the camera 310 (not shown) or may be remote on a server or workstation computer or computers (also not shown). Any typical process for capturing and storing digital images or traditional film images may be used. However, in cases in which the camera itself incorporates the tracker 312, communication of data associated with the tracking may be communicated with the workstation 320. Or, in some cases, visual data captured by the camera 310's media creation 316 may be used to augment the tracking data provided by the tracker 312 and that data may be provided to the workstation 320.

The trackers 312, 342, and 344 each include a tracking system 314, 347, 349. As discussed above, the tracking system may take many forms. And one device may track another device or vice versa. The relevant point is that the tracker 312, affixed to the camera 310 in a known, relative position, may be tracked relative to the display 330 with reference to the trackers 342, 344. In some cases, more or fewer trackers may be used. Trackers 312, 342, 344 may operate to track the camera 310 but may also track a human in front of the display 330.

The display 330 includes image rendering 336. This is a functional description intended to encompass many things, including instructions for generating images on the screen, storage for those instructions, one or more frame buffers (which may be disabled in some cases for speed), and any screen refresh systems that communicate with the workstation 320. The display 330 displays images provided by the workstation 320 for display on the display 330. The images shown on the display are updated, as directed by the workstation 320, to correspond to the current position of the camera 310 lens, based upon the trackers 312, 342, 344.

The workstation 320 includes the positional calculation 322, the resources storage 323, the image generation 324, the calibration functions 325, and the administration/user interface 326.

The positional calculation 322 uses data generated by the tracking systems 314, 347, 349, in each of the trackers 312, 342, 344, to generate positional data for the camera 310 (or human, or both), based upon the known relationships between the trackers 342, 344, and the display and between the tracker 312 and the camera 310 lens. In the most typical case, the relative distances can be used, geometrically, to derive the distance and height of the camera 310 (actually, the tracker 312 on the camera 310) relative to the display 330. The positional calculation 322 uses that data to derive the position. The details of a typical calculation are presented below with respect to FIGS. 4 and 5.

The resources storage 323 is a storage medium, and potentially a database or data structure, for storing data used to generate images on the display 330. The resources storage 323 may store three-dimensional maps of locations, associated textures and colors, any animation data, any characters (including their own three-dimensional characters and textures and animation data), as well as any special effects or other elements that a director or art director desires to incorporate into a live-action background. These resources are used by image generation 324, discussed below.

The image generation 324 is, essentially, a modified video game graphics engine. It may be more complex, and may incorporate functions and elements not present in a video game graphics engine, but in general it is software designed to present a three-dimensional world to a viewer on a two-dimensional display. That world is made up of the element stored in the resources storage 323, as described by a map file or other file format suitable for defining the elements and any actions within an overall background scene. The image generation 324 may include a scripting language that enables the image generation 324 to cause events to happen, or to trigger events or to time events that involve other resources or animations or backgrounds. The scripting language may be designed in such a way that it is relatively simple for a non-computer-savvy person to trigger events. Or, a technical director may be employed to ensure that the scripting operates smoothly.

The calibration functions 325 operate to set a baseline location for the camera 310 and baseline characteristics for the display 330. At the outset, the image generation 324 and positional calculation 322 are not sure of the actual size and dimensions of the display. The system 300 generally must be calibrated. There are various ways to calibrate a system like this. For example, a user could hold the tracker at each corner of the display and make a "note" to the software as to which corner is which. This is time-consuming and not particularly user-friendly. Film sets would be averse to such a cumbersome setup procedure each time the scene changes.

An alternative procedure involves merely setting up the trackers with known positions relative to the top, two display corners for any size display. Then, the image generation 324 can be instructed to enter a calibration mode and to display a cross-hair or other symbol on the center of the display 330. The tracker 312 may then be held at the center of the display and that position noted in software. By finding the exact center (or close enough within tolerances), the calibration functions 325 can extrapolate the full size of the display. The three points of tracker 342, tracker 344, and tracker 312 define a plane, so the calibration function 325 can determine the angle, and placement of the display plane. Also, the distance from the center of the display to the top, left corner is identical to that of the distance from the center of the display to the bottom right corner. The same is true for the opposite corners. As a result, the calibration function 325 can determine the full size of the display. Once those two elements are known, the display may be defined in terms readily translatable to traditional video game engines, and to the image generation 324.

The administration/user interface 326 may be a more-traditional user interface for the display 330 or an independent display of the workstation 320. That administration/user interface 326 may enable the administrator of the system 300 to set certain settings, to switch between different scenes, to cause actions to occur, to design and trigger scripted actions, to add or remove objects or background characters, or to restart the system. Other functions are possible as well.

Figure 4:
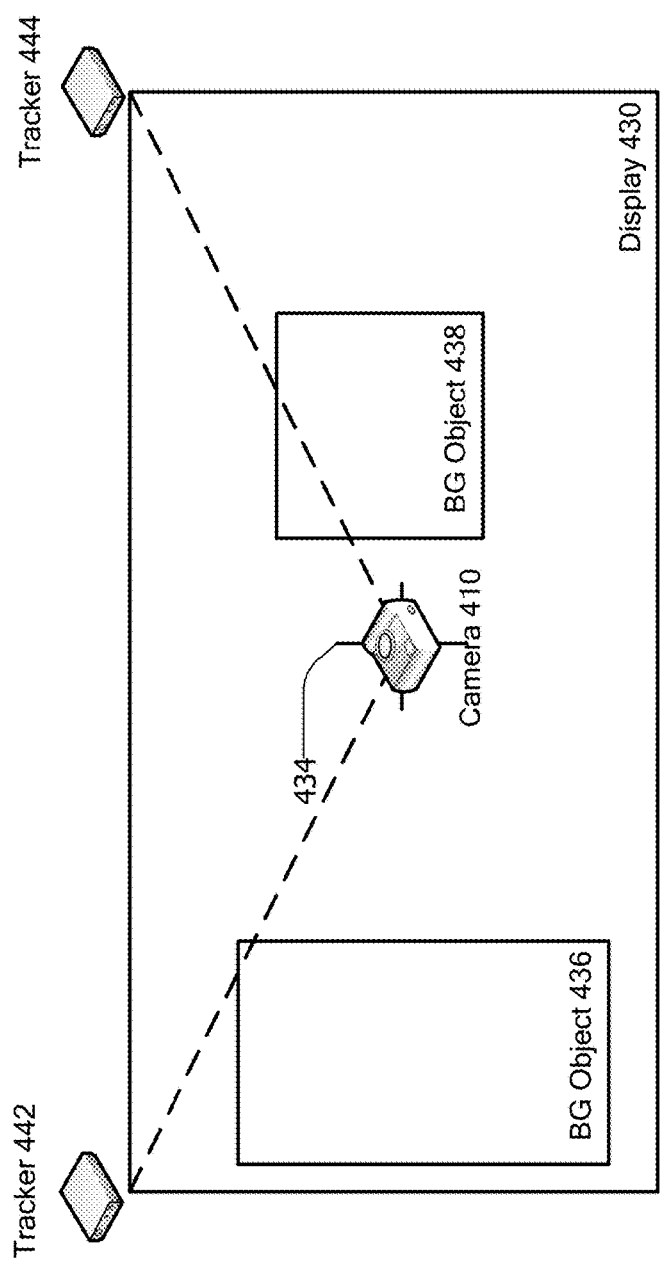
FIG. 4 is a functional diagram of calibration of a system for generating and capturing augmented reality displays.

FIG. 4 is a functional diagram of calibration of a system for generating and capturing augmented reality backgrounds for filming. FIG. 4 includes the camera 410 (associated tracker not shown), the display 430, the trackers 442, 444. The display 430 incorporates various background objects 436, 438.

The camera 410 is brought close to the crosshairs 434 shown on the display 430. The distances from the trackers 442 and 444 may be noted by the system. As discussed above with respect to FIG. 3, this enables the calibration to account for the position of the display as a two-dimensional plane relative to the camera 410 as the camera is moved away from the display 430. And, the center position enables the system to determine the overall height and width of the display 430 without manual input by a user. Should anything go awry, recalibration is relatively simple, simply re-enter calibration mode and place the camera 410 back at the crosshairs 434.

In cases in which humans are tracked, calibration may be avoided altogether by knowing the absolute position of the human-tracking camera 410 (or other sensor) relative to the display 430 itself In such cases, calibration may not be required at all, at least for the camera or other sensor that tracks the user's position relative to the display 430.

Figure 5:
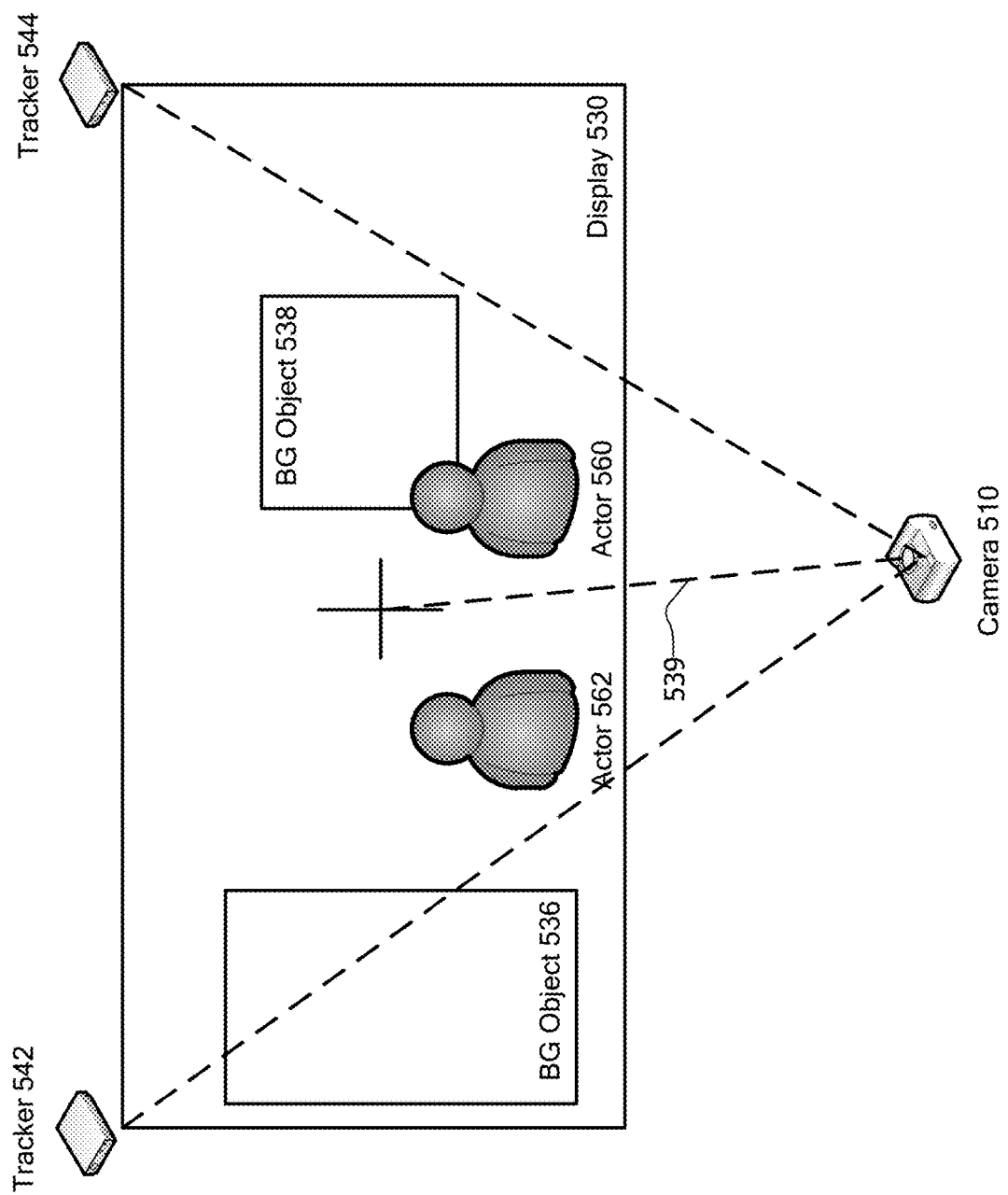
FIG. 5 is a functional diagram of camera positional tracking for a system for generating and capturing augmented reality displays.

FIG. 5 is a functional diagram of camera positional tracking for a system for generating and capturing augmented reality backgrounds for filming. Here, the same camera 510 (associated tracker not shown), display 530, and trackers 542, 544 are shown. Now that the system has been calibrated, the camera 510 is shown moved away from the display 530. The trackers 542 and 544 may calculate their distance from the camera and any direction (e.g. angles downward or upward from the calibration point) and use geometry to derive the distance and angle (e.g. angle of viewing) to a center point of the display 530 from the camera 510 lens. That data, collectively, is the appropriate perspective of the display. That perspective may be used to shift the background in a way that convincingly simulates the effect of movement of an individual to the perspective of a particular scene (e.g. as if the camera were a person and as that person's position changes, the background changes appropriately based upon that position).

As shown here, the actors 562 and 560 are present in front of the screen. The background objects 536 and 538 are present, but background object 538 is "behind" actor 560 from the perspective of the camera 510. The crosshairs shown may not be visible during a performance, but are shown to show the relative position of the camera to the center of the display.

Figure 6:
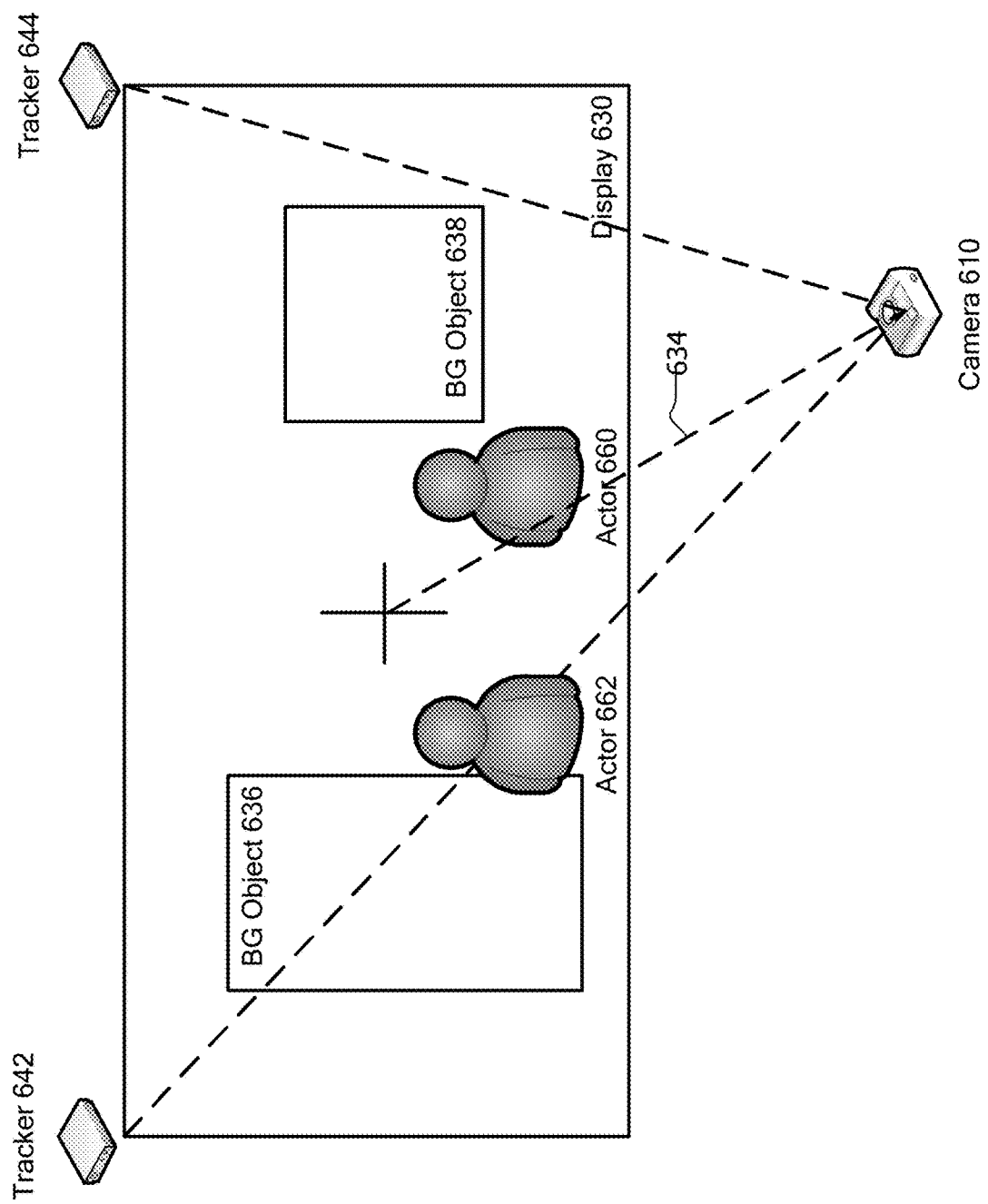
FIG. 6 is a functional diagram of camera positional tracking while moving for a system for generating and capturing augmented reality displays.

FIG. 6 is a functional diagram of camera positional tracking while moving for a system for generating and capturing augmented reality backgrounds for filming. This is the same scene as shown in FIG. 5, but after the camera 610 has shifted to the right, relative to the display 630. Here, the actors 662 and 660 have remained relatively stationary, but the camera 610's position has changed. From the calculated perspective of the camera 610, the background object 638 has moved out from "behind" the actor 660. This is because, the position of the camera 610 (the viewer) has shifted to the right and now, objects that were slightly behind the actor 660 from that perspective, have moved out from behind the actor. In contrast, the background object 636 has now moved "behind" actor 662, again based upon the shift in perspective.

The tracker 642 and tracker 644 may be used by the system along with the tracker (not shown) associated with the camera 610 to derive the appropriate new perspective in real-time and to alter the display accordingly. The workstation computer (FIG. 3) may update the images shown on the display to properly reflect the perspective as the live actors operate in front of that display 630. The crosshairs shown may not be visible during a performance, but are shown here to demonstrate the relative position of the camera to the center of the display.

FIG. 6 is shown with only a single display 630. There are situations in which multiple displays may be used with multiple cameras to generate more than a single perspective (e.g. for coverage shots of a scene) where the same or a different perspective on the same scene may be shot on one or more displays. For example, the refresh rates of a single display are typically as high as 60 hz. Motion picture filming is typically 24 frames per second, with some more modern options using 36 frames or 48 frames per second. As a result, a 60 hz display can reset itself up to 60 times a second, more than covering the necessary 24 frames and nearly covering the 36 frames.

In this case, two cameras can be used, each with shutters synchronized to every other frame of imagery displayed on the display 630. Using this, the trackers 642 and 644 can actually track the locations of both cameras and the associated workstation can alternate between images intended for a first camera and those intended for a second camera. In such a way, different perspectives for the same background may be captured using the same display. Polarized lenses may also be used for the cameras (or a person, as discussed below) to similar effect.

Alternatively, multiple displays may be provided, one for each camera angle. In some cases, these multiple displays may be an entire sphere or half-sphere in which actors and crews are placed for filming (or humans for taking part in a game). In such cases, perspectives may be based upon trackers fixed to cameras pointing in different directions to thereby enable the system to render the same scene from multiple perspectives so that coverage for the scene can be provided from multiple perspectives.

Figure 7:
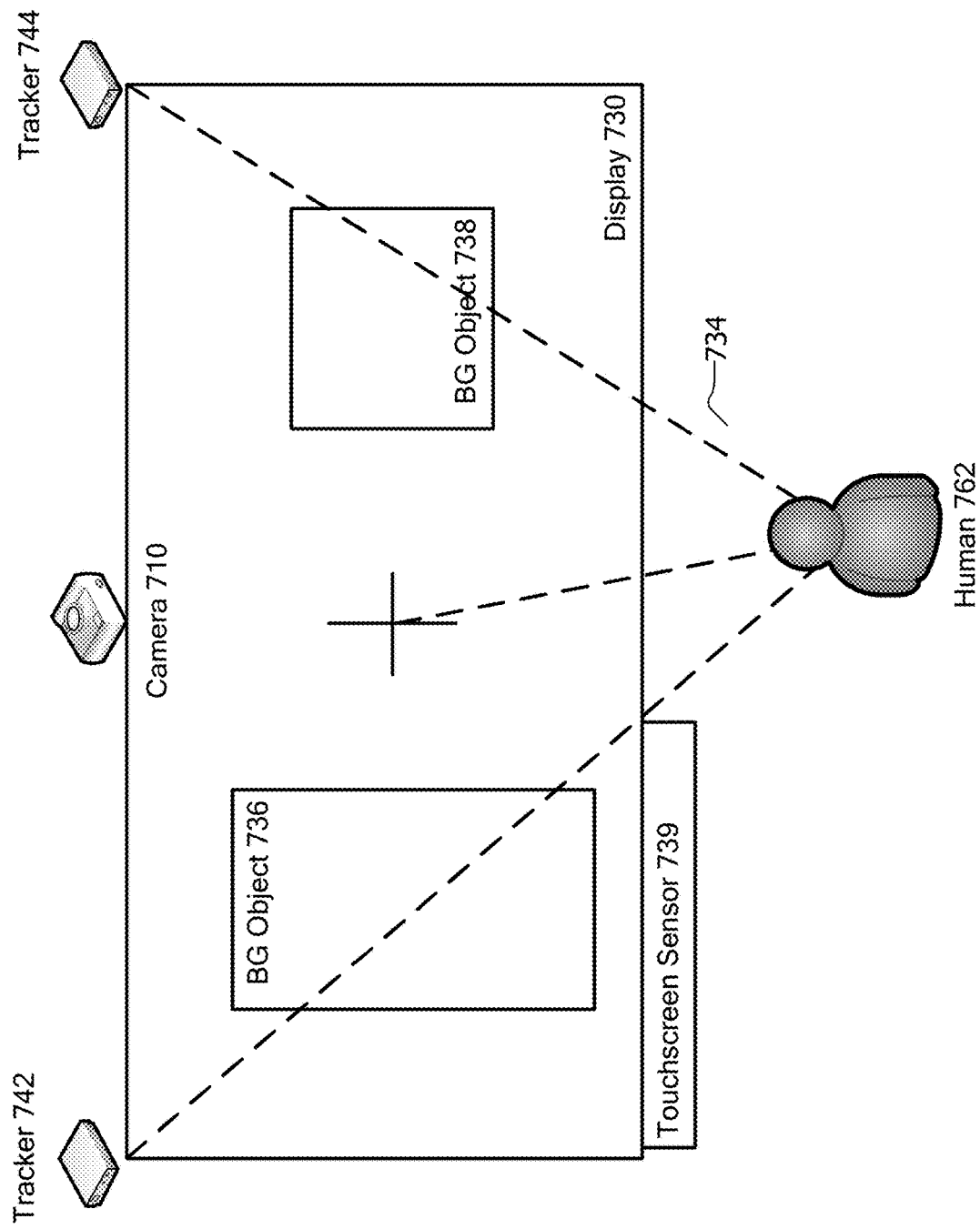
FIG. 7 is a functional diagram of human positional tracking while the human is moving for a system for dynamically updating an augmented reality screen for interaction with a viewer.

FIG. 7 is a functional diagram of human positional tracking while the human is moving for a system for dynamically updating an augmented reality screen for interaction with a viewer. This is similar to the diagrams shown in FIGS. 4-6, but here at least one camera 710 is fixed relative to the display and tracks the human 762. Though human is discussed here, other objects (e.g. robots, horses, dogs, and the like) could be tracked and similar functionality employed. In addition or alternatively, the trackers 742 and 744 may track the human 762. These trackers 742 and 744 and camera 710 may rely upon LIDAR, infrared sensors and illuminators, RGB cameras coupled with face or eye tracking, fiducial markers, or other tracking schemes to detect a human presence in front of the display 730, and to update the location or relative location of that human relative to the display 730.

As with the camera tracking systems of FIGS. 4-6, the BG objects 736 and 738 may have their associated perspective updated as the human 762 moves. This may be based upon an estimate of the human 762's eye location, or based upon the general location of that human's mass. Using such a display 730, a virtual or augmented reality world may be "shown" to a human 762 that appears to track that user's movement appropriately as if it were a real window. The human 762's movement may cause the display 730 to update appropriately, including occlusion by the BG objects 736 and 738, as appropriate as the human 762 moves.

In some cases, a touchscreen sensor 739 may be integrated into or make up a part of the display 730. This touchscreen sensor 739 is described as a touchscreen sensor, and it may be capacitive or resistive touchscreen technologies. However, it may instead rely upon motion tracking (e.g. raising an arm, or pointing toward the display 730) based upon the trackers 742 and 744 and/or the camera 710 to enable "touch" functionality for the display 730. Using this touchscreen sensor 739, interactions with the images shown on the display 730 may be enabled. Alternatively, the touchscreen sensor 739 may be an individual's own mobile device, such as a table or mobile phone. A user may use his or her phone, for example, to interact with the display in some cases.

Description of Processes

Figure 8:
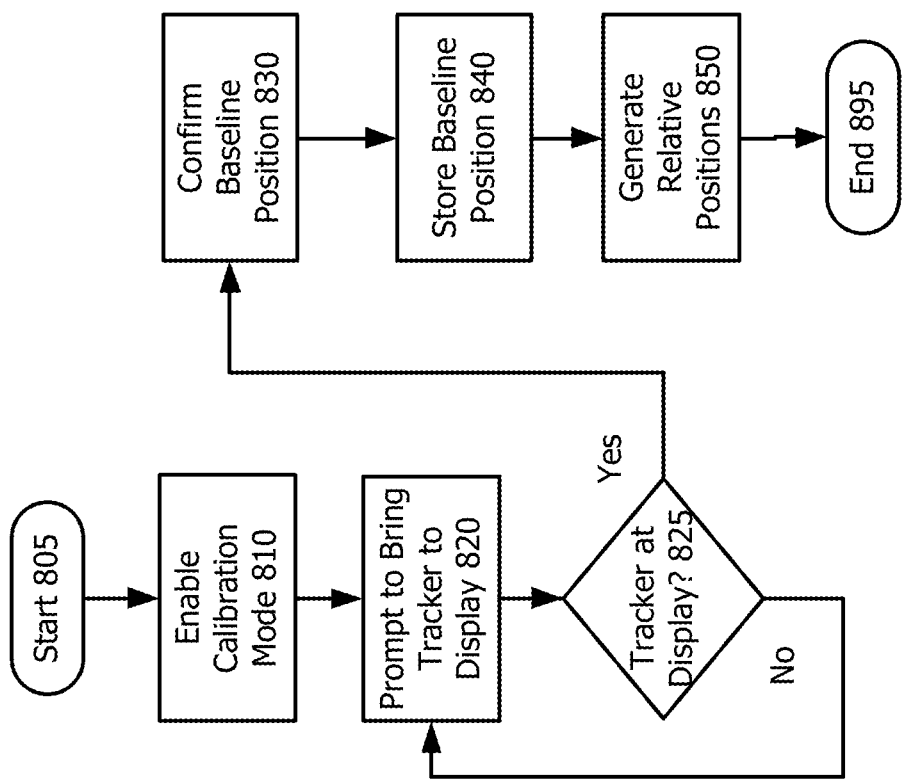
FIG. 8 is a flowchart of a process for camera and display calibration.

Referring now to FIG. 8, a flowchart of a process for camera and display calibration is shown. The flow chart has both a start 805 and an end 895, but the process may repeat as many times as necessary should the system be moved, fall out of calibration, or otherwise be desired by a user.

Following the start 805, the process begins by enabling calibration mode 810. Here, a user or administrator operates the workstation or other control device to enter a mode specifically designed for calibration. As discussed above, there are various options for calibration, but the one used herein is disclosed in this flowchart. In this calibration mode, a crosshair or similar indicator is shown on the display once calibration mode is enabled at 810.

Next, the user may be prompted to bring the tracker to the display at 820. On-screen guides or prompts may be provided, the display may be more complex than a crosshair and may include an outline of a camera rig or of a tracker that is to be brought to the display. In this way, the user may be prompted as to what to do to complete the calibration process.

If the tracker is not brought to the display ("no" at 825), then the user may be prompted again at 820. If the user has brought the tracker to the display (presumably in the correct position), then the user may confirm the baseline position at 830. This may be by clicking a button, exiting calibration mode, or through some other confirmation (not moving the camera for 10 seconds while in calibration mode).

The baseline information (e.g. relative positions of the trackers to the display and the camera to its associated tracker and the position of the center of the display) is then known. That information may be stored at 840.

Next, the system may generate the relative positions, and the size of the display at 850. At this stage, the plane of the display is defined using this data and the size of the display is set.

An example of this may be that the display is a total of 10 meters high by 15 meters wide. Moving the camera's tracker to the center point of the display, the tracker system can detect that the camera's tracker is approximately 9.01 meters from the tracker and at a specific angle. The Pythagorean theorem can be used to determine that if a hypotenuse of a triangle forming of ⅛ of the display area (the line to the center of the display) is 9.01 meters, and the distance between the two trackers on the display is 15 meters (the top side of the display), then the other two sides are 7.5 meters (½ of the top) and 5 meters, respectively. As a result, the width of the display is 10 meters.

The process may then end at 895.

Figure 9:
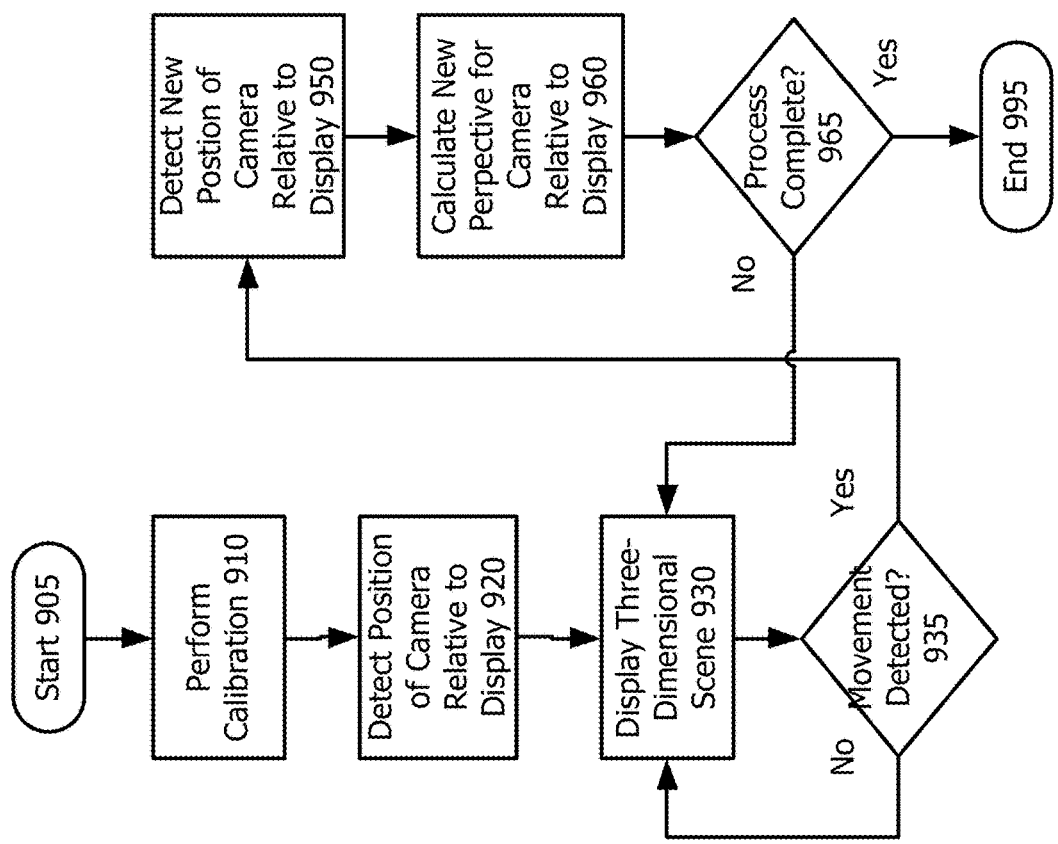
FIG. 9 is a flowchart of a process for positional tracking.

FIG. 9 is a flowchart of a process for positional tracking. The process has a start 905 and an end 995, but the process may take place many times and may repeat, as shown in the figure itself.

Following the start 905, the process begins by performing calibration at 910. The calibration is described above with respect to FIG. 8.

Once calibration is complete, the position of the camera relative to the display may be detected at 920. This position is detected using two distances (the distance from each tracker). From that, knowing the plane of the display itself, the relative position of the camera to the display may be detected. Tracking systems are known to perform these functions in various ways.

Next, the three-dimensional scene (e.g. for use in filming) is displayed at 930. This scene is the one created by an art director or the director and including the assets and other animations or scripted actions as desired by the director. This is discussed in more detail below.

If movement is not detected ("no" at 935), then the scene remains relatively fixed and remains being displayed. There may be animations (e.g. wind blowing) or other baseline things taking place in the scene, but the perspective of the scene remains unchanged.

If movement is detected ("yes" at 935), then the new position of the camera relative to the display is detected at 950. This new positional information for the camera is used to calculate a new perspective for the camera relative to the display at 960.

If the process (e.g. filming) is not complete ("no" at 965), then the process continues at 930. If the process is complete ("yes" at 965), then the process ends at 995.

Figure 10:
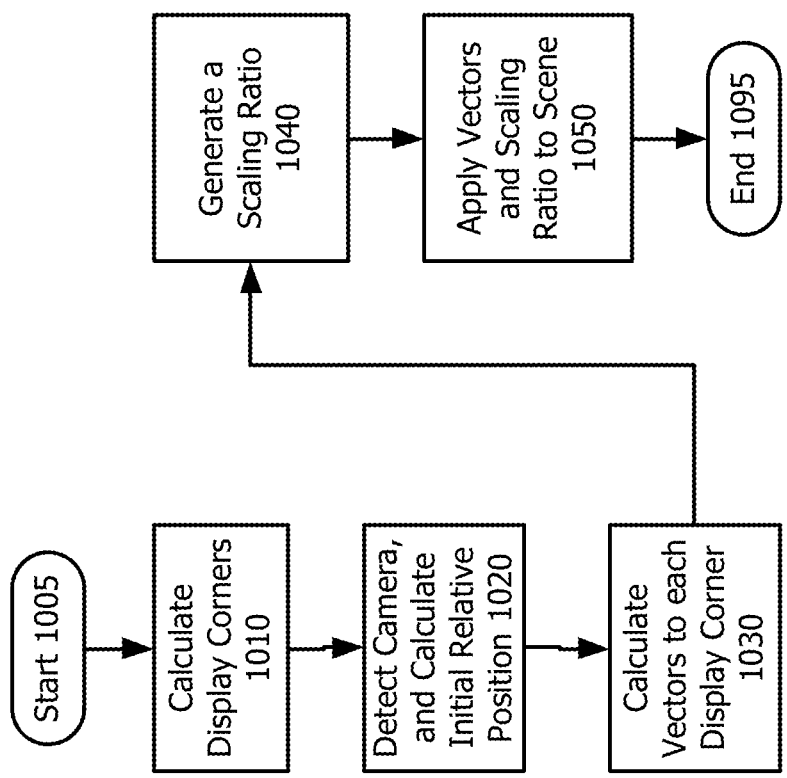
FIG. 10 is a flowchart of a process for calculating camera position during positional tracking.

FIG. 10 is a flowchart of a process for calculating camera position during positional tracking. The process begins at the start 1005 and ends at 1095, but may repeat each time the camera moves following calibration.

The process is sufficiently efficient that it can complete in essentially real-time such that no visible "lag" in the display relative to the actors or the camera may be detected. One of the elements that enables this lack of "lag" is the affirmative ignoring of tracking data related to the camera orientation, as opposed to positional data. Specifically, tracking systems tend to provide a great deal of data not only of the position (e.g. an (x, y, z) location in three-dimensional space (more typically defined as vectors from the tracker(s)), but also of orientation.

The orientation data indicates the specific orientation that the tracker is being held at within that location. This is because most trackers are designed for augmented reality and virtual reality tracking. They are designed to track "heads" and "hands". Those objects need orientation data as well as positional data (e.g. the head is "looking up") so as to accurately provide an associated VR or AR view to the user. For the purposes that these trackers are employed in the present system, that data is generally irrelevant. As a result, any such data provided is ignored, discarded, or not taken into account, unless it is needed for some other purpose. Generally, the camera will be assumed to always be facing the display at virtually, if not actually, somewhere on a parallel plane. This is because moving the camera to a different location will cause the illusion to fall away. In situations involving dome or half-sphere setups, that data may be used. But, reliance upon that data may significantly slow processing and introduce lag. Similarly, other systems reliant upon computer vision or detection introduce lag for similar computationally intense reasons.

The process of displaying this scene is a variation on a typical scene presentation used for some time in the context of three-dimensional graphics rendering for video games, augmented reality, or virtual reality environments. The mathematics for rendering real-time 3D computer graphics typically consists of using a perspective projection matrix to map three-dimensional points to a two-dimensional plane (the display). A left-handed perspective projection matrix is usually defined on-center as follows:

$$\begin{bmatrix} \frac{2z_n}{w} & 0 & 0 & 0 \\ 0 & \frac{2z_n}{h} & 0 & 0 \\ 0 & 0 & \frac{z_f}{z_f - z_n} & 1 \\ 0 & 0 & \frac{z_n z_f}{z_n - z_f} & 0 \end{bmatrix}$$

w,h=width, height of view-volume at near plane
$z_n$, $z_f$=distant of near, far place The view-volume can be offset by rendering with an off-center perspective projection matrix using the following:

$$\begin{bmatrix} \frac{2z_n}{r-l} & 0 & 0 & 0 \\ 0 & \frac{2z_n}{t-b} & 0 & 0 \\ \frac{l+r}{l-r} & \frac{t+b}{b-t} & \frac{z_f}{z_f - z_n} & 1 \\ 0 & 0 & \frac{z_n z_f}{z_n - z_f} & 0 \end{bmatrix}$$

l,r=minimum, maximum x-value of view-volume at near plane
b,t=minimum, maximum y-value of view-volume at near plane Determining the values for l, r, b, t that correspond to the camera position creates an accurate view-dependent perspective shift. The method for determining view-dependent values for l, r, b, t are as follows:

First, a virtual screen to scale is placed in the 3D scene at the desired virtual location to represent the screen. Next, the corners of the screen are determined at 1010 using the tracker information and calibration process as discussed above. Next, the left-handed screen axes which are used in traditional three-dimensional graphics engines may be calculated. Specifically, the right, up, and forward (normal) unit vectors from the screen corner positions to the camera may be calculated at 1020 as follows:

$$\hat{r} = \frac{BR - BL}{|BR - BL|}$$

$$\hat{u} = \frac{TL - BL}{|TL - BL|}$$

$$\hat{f} = \hat{u} \times \hat{r}$$

$\hat{f} = \hat{u} \times \hat{r}$

Next, the extent of the frustum of the view-volume from viewer position may be generated by calculating vectors to the display corners from the known camera position at 1030.

$\vec{c}$ =TL−viewer $\vec{a}$ =BL−viewer $\vec{b}$ =BR−viewer

Next, the display must be appropriately scaled to account for the distance of the camera from the display. To do this, we calculate a ratio of the distance between the camera (near plane) and screen plane at 1040. This ratio may be used as a scale factor since frustum extents are specified at the near plane as follows:

$$\text{scale} = \frac{z_n}{-(\hat{f} \cdot \vec{a})}$$

Finally, the vectors and scaling ratio are applied to the scene at 1050 using the camera perspective, view-dependent extents of the projection. To do this, l, r, b, t are calculated as follows:

$l=(\hat{r} \cdot \vec{a}) \times \text{scale}$ $r=(\hat{r} \cdot \vec{b}) \times \text{scale}$ $b=(\hat{u} \cdot \vec{a}) \times \text{scale}$ $t=(\hat{u} \cdot \vec{c}) \times \text{scale}$ Calculating a precise camera position is important for the illusion effect to function correctly. To ensure it happens quickly, the tracking system may update and execute concurrently in a separate thread (CPU core) independent of other threads to minimize latency. The other systems of the workstation (e.g. rendering itself) may read current telemetry data (position, orientation) from the tracking system per frame update. Minimized motion-to-photon latency is achieved by keeping the rendering executing at 60 Hz or higher. In the experience of the inventors, if the rendering system reads tracking data at 60 FPS, then the motion-to-photon (e.g. camera to display on screen) latency is approximately 16.66 milliseconds. At such low levels of latency, the results are virtually or actually imperceptible to human vision and the camera.

Figure 11:
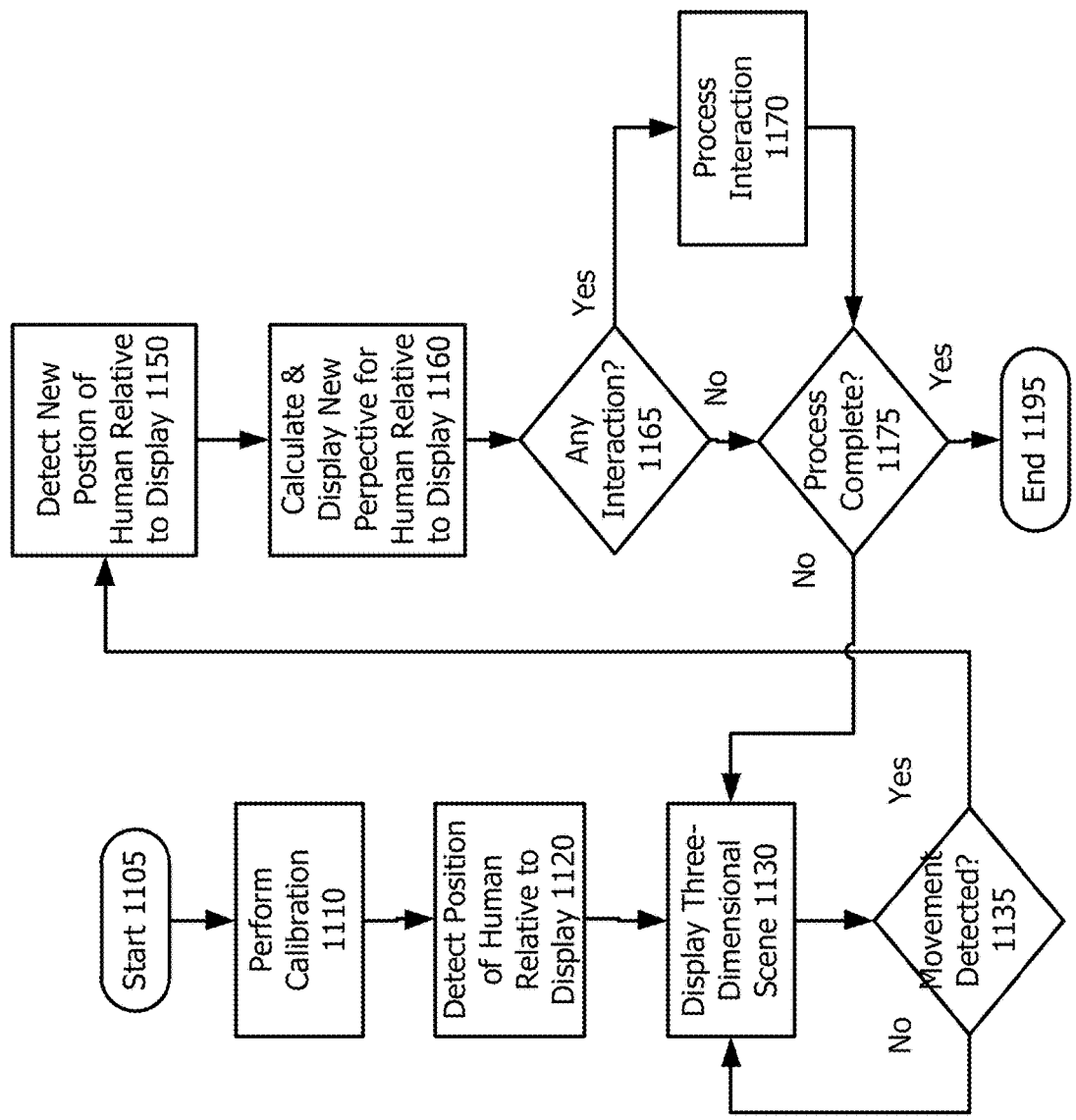
FIG. 11 is a flowchart of a process for human positional tracking.

FIG. 11 is a flowchart of a process for human positional tracking. The process begins at 1105 and ends at 1195. FIG. 11 is quite similar to the tracking described with reference to FIG. 9. And, the tracking may take place in much the same way as described above. Only the differences relative to human positional tracking, and its relevance to the associated processes will be described in detail here below.

As with FIG. 9, calibration is performed at 1110. This may be unnecessary if there is no external camera. But, an initial calibration may be required to enable accurate human tracking in front of a display to take place. This may be as simple as affirmatively defining the location(s) of the camera and/or trackers, relative to the display, so that human tracking can take place accurately.

Once calibration has taken place at 1110, the position of a human before the display may be detected at 1120. This detection may rely upon infrared, LIDAR, fiducial markers, RGB cameras in conjunction with image processing software, or other similar methods. Regardless, an actual detection of the tracked human's eyes or eye location or an estimate of the human's eye location is detected and/or generated as a part of this process.

This information is used in much the same way as detection of the tracker for the camera is used in FIG. 9, specifically, to display a three-dimensional scene at 1130 with perspective suitably tied to the human's eye location. In this way, the scene on the display is rendered in such a way that it appears "correct" to the detected human.

Next, if no movement is detected (e.g. by the camera(s) or tracker(s)) ("no" at 1135), then the same scene is continued to be displayed. The scene itself may be active (e.g. things may be happening on the display such as a series of events, a sunrise, other real or animated actors or action, gunfire, rainfall, or any other number of actions), but no perspective shift is processed, because there is no movement of the tracked human.

If movement is detected (e.g. by the camera(s) or tracker(s)) at 1135 ("yes" at 1135), then the human's new position is detected relative to the display at 1150. Here, the updated location of the human's eyes or an estimated location of the human's eyes is generated and/or detected by the camera(s) and/or tracker(s).

Next, the new perspective for the human relative to the display is calculated and displayed for the human at 1160. Here, the change is altered so as to reflect the perspective shift detected by movement of the human's head, body, or eyes. This can take place incredibly fast, so that the scene essentially updates in real-time with no discernable lag to a human viewer. In this way, the scene can appear to be a "portal" or "window" into a virtual or augmented reality world.

The system may also track interactions using "touch" sensors or virtual touch sensors, as discussed above with respect to FIG. 7. If such a "touch" (which may merely be interactions in mid-air), is detected ("yes" at 1165), then the interaction may be processed at 1170. This processing may be to update the scene (e.g. a user selected an option on the display) or to interact with someone (e.g. shake hands) shown on screen, to fire a weapon, or to cause some other shift in the display.

If there is no interaction ("no" at 1165) or after any interaction is processed at 1170, a determination whether the process is complete can be made at 1175. This may occur when the user has ceased being in frame of the camera or tracker(s) tracking the human and a timeout occurs or may be triggered externally by an administrator. Other reasons for the process completing ("yes" at 1175) are also possible. Thereafter, the process will end at 1195.

However, until the process is complete ("yes" at 1175), the scene will continue to be displayed at 1130, movement detected at 1135, and the overall updating of the scene according to movement and interaction 1150-1175.

Figure 12:
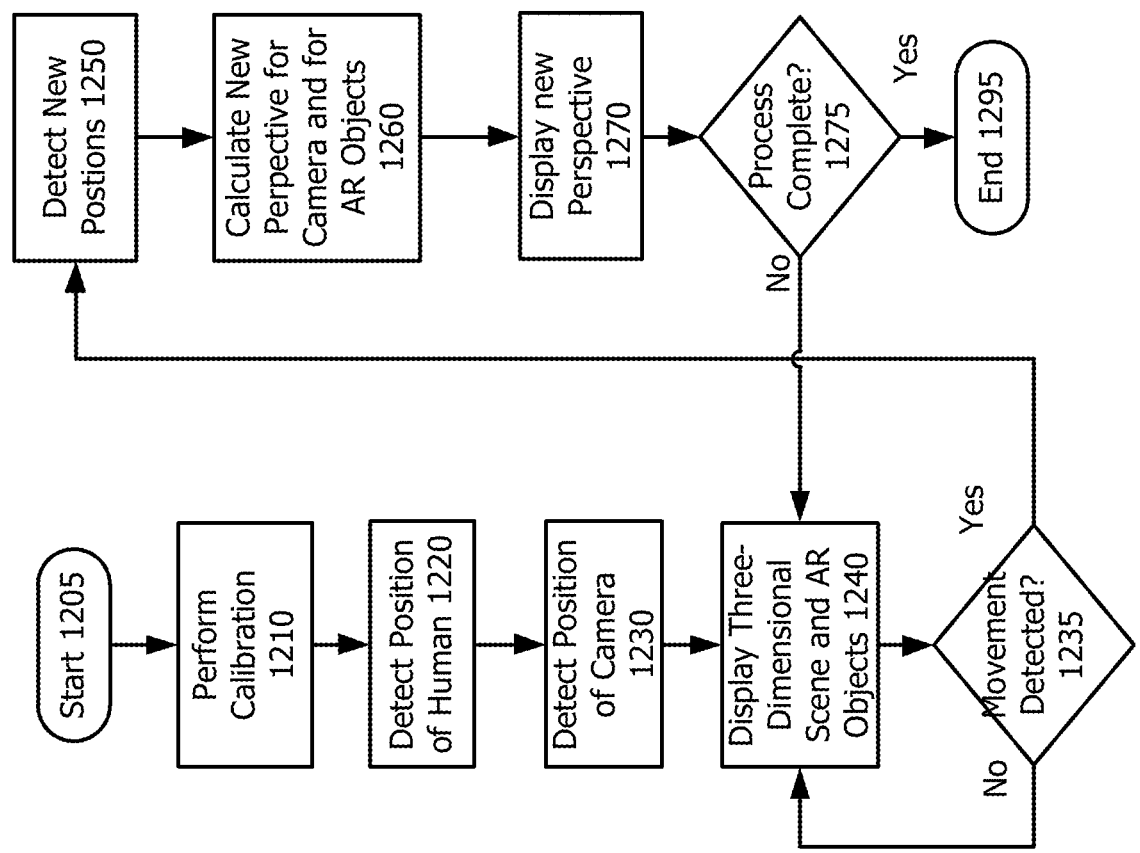
FIG. 12 is a flowchart of a process for human positional tracking and superimposition of AR objects in conjunction with the human.

FIG. 12 is a flowchart of a process for human positional tracking and superimposition of AR objects in conjunction with the human. The process begins at 1205 and ends at 1295, but may take place many times. As with FIG. 11, this figure corresponds in large part to FIG. 9. Only those aspects that are distinct will be discussed here.

Following the start 1205, the process begins with calibration 1210. Here, there may be multiple cameras and/or trackers. So, the camera tracking the human, if it is fixed relative to a display, may not require any calibration. However, for the camera filming the scene with the display as the active background, calibration may be required, as described with respect to FIGS. 8 and 9.

Next, the human's position is detected at 1220. Here, the tracker(s) and/or camera(s) that track a human's location relative to the display determine where a human is relative to the display. This information is necessary to enable the system to place augmented reality objects convincingly relative to the human.

Next, the position of the camera is detected at 1230. This is the camera that is filming the display as a background with the human superimposed in-between. Here, the position of the camera is calculated so that the scene shown on the display may be rendered appropriately.

Though this detection at 1230 is discussed with respect to a camera, it could merely be the detection of the perspective of a viewing human (e.g. an audience of one) watching the scene. In such a case, similar human tracking systems and methods as discussed with respect to FIG. 11 would be employed.

Next, the three-dimensional scene is shown with any desired AR objects at 1240. This step has at least three sub-components. First, the perspective (and any associated perspective sift) for the scene itself must be accurately reflected on the display. This is done using the position of the camera alone.

Second, the position of the individual, relative to the camera and the display must be generated. This is based upon the detected position of the human relative to the display, and then the detection of the camera's relative position. These two pieces of data may be combined to determine the relative position of the camera to the human and the display.

Thereafter, an augmented reality object or objects must be rendered. Typically, these would be selected ahead of time as a bit of a "special effect" for use in the scene being filmed. In a very basic example, an individual whose location is known relative to the display may be seen to "glow" with a bright light surrounding his or her body. This glow may be presented on the display, but because it is updated in real-time, and reliant upon the camera location and the human location, it may appear to the camera as it is recording the scene. Using real-time human tracking, the glow may follow the user, but at this step 1240, the glow is merely presented as "surrounding" the user or however the special effect artist has indicated that it should take place.

Other examples of augmentation could be beams firing from hands (either automatically, or upon specific instruction, e.g. pressing a fire button, by a special effects supervisor or assistant director), a halo over an individual's head as he or she walks, apparent "wings" on a human's back that only appear behind the human, and other effects may also be applied that appear to come from or emanate from a human that is tracked.

In this case, if no movement is detected ("no" at 1235), then the effect goes on. The effect itself (e.g. the glow or mist or pules or beams) may have its own independent animation that continues, but it will not "move" with the human.

If movement is detected ("yes" at 1235), then the new position of the human at of the camera are both detected at 1250, and the display is updated to reflect the perspective of the scene, and to reflect the new location of the digital effect. Notably, if an actor is in front of the display, to have accurate perspective shift reflected for, for example, a halo over that human's head, the halo will appear "closer" to the camera than the background. So, the associated perspective shift will be less for the halo (because it is closer), than for the background.

The new perspective data for the camera and the AR object(s) are calculated at 1260, and the new perspective is updated to the display at 1270.

A determination if the process is complete is made at 1275. If it is not complete ("no" at 1275), then the process continues with the display of the three dimensional scene and any AR object(s) at 1240. If the process is complete ("yes" at 1275), then the process ends at end 1295.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system comprising:
   a display for displaying images generated by a computing device in communication with the display;
   a sensor for detecting a location relative to the display of a camera capturing an image of the display from a movable position, relative to the display;
   the computing device in communication with the display for:
   displaying an image on the display so as to correspond to a first perspective for objects shown in the image based upon the location relative to the display determined using the sensor, and
   continuously adjusting the image shown on the display so as to correspond to additional perspectives suitable for the objects shown in the image based upon an updated current location relative to the display determined using the sensor; and
   the camera simultaneously capturing a composite image including a human, a figure, or a physical object in front of the display and the image shown on the display showing the first perspective and the additional perspectives based upon the location and the updated current location.

2. The system of claim 1 further comprising:
   a second display for displaying images generated by a computing device in communication with the second display;
   the computing device in communication with the second display for:
   displaying a second image on the second display so as to correspond to a second perspective for objects shown in the image based upon the location relative to the second display determined using the sensor, and
   continuously adjusting the second image shown on the second display so as to correspond to further additional perspectives suitable for the objects shown in the second image based upon the updated current location relative to the second display determined using the sensor; and
   the camera further capturing the second image shown on the second display showing the second perspective and the further additional perspectives based upon the location and the updated current location.

3. The system of claim 1, further comprising:
   a second sensor for detecting a second location relative to a second display of a second camera;
   the second display for displaying images generated by the computing device in communication with the second display;
   the computing device in communication with the second display for:
   displaying a second image on the second display so as to correspond to a second perspective for objects shown in the image based upon the second location relative to the second display determined using the second sensor, and
   continuously adjusting the second image shown on the second display so as to correspond to further additional perspectives suitable for the objects shown in the second image based upon an updated second current location relative to the second display determined using the second sensor; and
   the second camera capturing the second image shown on the second display showing the second perspective and the further additional perspectives based upon the second location and the updated second current location.

4. The system of claim 1 wherein the location is a position of the camera viewing the display.

5. The system of claim 1 further comprising:
   a tracker for tracking movement of a human participant;
   wherein the computing device is further for continuously adjusting the image shown on the display by altering the appearance of the image shown on the display to incorporate elements that respond to actions of the human participant based upon a perspective from the location of the camera relative to the display.

6. The system of claim 5 wherein the elements are positioned relative to the human participant are visual elements that remain fixed relative to a particular portion of a body of the human participant as the human participant moves in front of the display.

7. The system of claim 1 further comprising:
at least one touch sensor for enabling physical interaction with the display;
wherein the computing device is further for receiving input from the at least one touch sensor from a user; and
altering the image shown on the display in response to the input.

8. An apparatus comprising non-volatile machine-readable medium storing a program having instructions which when executed by a processor will cause the processor to:
detect a location relative to a display of a camera, using a sensor, the camera for capturing an image of the display from a movable position, relative to the display;
display an image on the display so as to correspond to a first perspective for objects shown in the image based upon the location relative to the display determined using the sensor, and
continuously adjust the image shown on the display so as to correspond to additional perspectives suitable for the objects shown in the image based upon an updated current location relative to the display determined using the sensor; and
simultaneously capture a composite image including a human, a figure, or a physical object in front of the display and the image shown on the display using the camera, the image showing the first perspective and the additional perspectives based upon the location and the updated current location.

9. The apparatus of claim 8 wherein the instructions further cause the processor to:
display a second image on a second display so as to correspond to a second perspective for objects shown in the image based upon the location relative to the second display determined using the sensor, and
continuously adjust the second image shown on the second display so as to correspond to further additional perspectives suitable for the objects shown in the second image based upon the updated current location relative to the second display determined using the sensor; and
capture, using the camera, the second image shown on the second display showing the second perspective and the further additional perspectives based upon the location and the updated current location.

10. The apparatus of claim 8 wherein the instructions further cause the processor to:
detect, using a second sensor, a second location relative to a second display of a second camera;
display a second image on the second display so as to correspond to a second perspective for objects shown on the image based upon the second location relative to the second display determined using the second sensor, and
continuously adjust the second image shown on the second display so as to correspond to further additional perspectives suitable for the objects shown in the second image based upon an updated second current location relative to the second display determined using the second sensor; and
capture, using the second camera, the second image shown on the second display, the second image showing the second perspective and the further additional perspectives based upon the second location and the updated second current location.

11. The apparatus of claim 8 wherein the location is a position of the camera viewing the display.

12. The apparatus of claim 8 wherein the instructions further cause the processor to:
track movement of the human viewer relative to the display using a tracker; and
continuously adjust the image shown on the display by altering the appearance of the image shown on the display to incorporate elements that respond to actions of the human participant based upon a perspective from the location of the camera relative to the display.

13. The apparatus of claim 12 wherein the elements are positioned relative to the human participant are visual elements that remain fixed relative to a particular portion of a body of the human participant as the human participant moves in front of the display.

14. The apparatus of claim 8 wherein the instructions further cause the processor to:
enable physical interaction with the display using at least one touch sensor;
detect input received from the at least one touch sensor from a user; and
alter the image shown on the display in response to the input.

15. The apparatus of claim 8 further comprising:
the processor;
a memory;
wherein the processor and the memory comprise circuits and software for performing the instructions on the storage medium.

16. A method for enabling filming using a real-time display, the method comprising:
detecting a location relative to a display of a camera, using a sensor, the camera for capturing an image of the display from a movable position, relative to the display;
displaying an image on the display so as to correspond to a first perspective for objects shown in the image based upon the location relative to the display determined using the sensor, and
continuously adjusting the image shown on the display so as to correspond to additional perspectives suitable for the objects shown in the image based upon an updated current location relative to the display determined using the sensor; and
simultaneously capturing a composite image including a human, a figure, or a physical object in front of the display and the image shown on the display using the camera, the image showing the first perspective and the additional perspectives based upon the location and the updated current location.

17. The method of claim 16 further comprising:
displaying a second image on a second display so as to correspond to a second perspective for objects shown on the image based upon the location relative to the second display determined using the sensor, and
continuously adjusting the second image shown on the second display so as to correspond to further additional perspectives suitable for the objects shown in the second image based upon the updated current location relative to the second display determined using the sensor; and
capturing, using the camera, the second image shown on the second display showing the second perspective and the further additional perspectives based upon the location and the updated current location.

18. The method of claim 16 further comprising:
- detecting, using a second sensor, a second location relative to a second display of a second camera;
- displaying a second image on the second display so as to correspond to a second perspective for objects shown on the image based upon the second location relative to the display determined using the second sensor, and
- continuously adjusting the second image shown on the second display so as to correspond to further additional perspectives suitable for the objects shown in the second image based upon an updated second current location relative to the second display determined using the second sensor; and
- capturing, using the second camera, the second image shown on the second display, the second image showing the second perspective and the further additional perspectives based upon the second location and the updated second current location.

19. The method of claim 16 wherein the location is a position of the camera viewing the display.

20. The method of claim 16 further comprising:
- tracking movement of the human viewer relative to the display using a tracker; and continuously adjusting the image shown on the display by altering the appearance of the image shown on the display to incorporate elements that respond to actions of the human participant based upon a perspective from the location of the camera relative to the display.

\* \* \* \* \*